(12) United States Patent
Nasheri et al.

(10) Patent No.: US 8,173,224 B2
(45) Date of Patent: May 8, 2012

(54) IMPREGNATION PROCESS

(75) Inventors: Kourosh Nasheri, Rotorua (NZ); Gavin James Durbin, Rotorua (NZ)

(73) Assignee: Titan Wood Limited (GB)

( * ) Notice: Subject to any disclaimer, the term of this patent is extended or adjusted under 35 U.S.C. 154(b) by 426 days.

(21) Appl. No.: 10/590,188

(22) PCT Filed: Aug. 25, 2005

(86) PCT No.: PCT/NZ2005/000022
§ 371 (c)(1),
(2), (4) Date: Jan. 29, 2007

(87) PCT Pub. No.: WO2005/077626
PCT Pub. Date: Aug. 25, 2005

(65) Prior Publication Data
US 2007/0128422 A1     Jun. 7, 2007

(30) Foreign Application Priority Data

Feb. 18, 2004     (NZ) ......................................... 531217

(51) Int. Cl.
*B05D 1/18* (2006.01)
(52) U.S. Cl. .......... 427/440; 427/439; 427/297; 427/235
(58) Field of Classification Search ............... 427/430.1, 427/440, 297
See application file for complete search history.

(56) References Cited

U.S. PATENT DOCUMENTS

| | | | |
|---|---|---|---|
| 3,094,431 A | | 6/1963 | Goldstein et al. |
| 4,303,705 A | * | 12/1981 | Kelso, Jr. .................... 427/351 |
| 4,466,998 A | * | 8/1984 | McIntyre et al. ............. 427/297 |
| 5,679,407 A | * | 10/1997 | Mansikkamaki et al. .... 427/297 |
| 6,236,403 B1 | | 5/2001 | Chaki et al. |
| 6,376,582 B1 | * | 4/2002 | Iwata et al. ..................... 524/14 |

FOREIGN PATENT DOCUMENTS

| | | |
|---|---|---|
| CA | 1255977 | 6/1989 |
| EP | 680810 A | 11/1995 |
| EP | 680810 A1 * | 11/1995 |
| GB | 1432649 | 4/1976 |
| GB | 1512549 | 6/1978 |
| RU | 2230658 | 6/2004 |
| WO | WO-01/24982 | 4/2001 |

OTHER PUBLICATIONS

"Boiling", https://chem.purdue.edu/gchelp/liquids/boiling, published 2001.*
"Boiling Point", http://en.wikipedia.org/boiling_point, retrieved Jun. 2, 2010.*

* cited by examiner

*Primary Examiner* — David Turocy
(74) *Attorney, Agent, or Firm* — Vic Y. Lin; Innovation Capital Law Group, LLP

(57) ABSTRACT

The invention relates to a process for impregnating wood or wood based material. A working solution is preheated to a temperature above the atmospheric boiling point ("a super hot temperature") above the atmospheric boiling point ("a super hot temperature") of the working solution, at an elevated pressure sufficient to maintain the working solution in the liquid phase. The working solution is contacted with a wood or wood based material at a super hot temperature and an elevated pressure to cause impregnation of the solution into the wood or wood based material. The impregnated wood or wood based material and any remaining working solution, waste material and/or by-products are then separated.

26 Claims, 4 Drawing Sheets

IMPREGNATION PROCESS

FIELD OF THE INVENTION

This invention relates generally to impregnation processes for impregnating wood or wood products to improve the decay resistance, dimensional stability and/or UV resistance of the wood and densify the wood and in particular to an acetylation impregnation process.

BACKGROUND

Wood and wood based products have properties that may be improved to improve the performance characteristics of wood, and to extend their application to new fields, including, for example dimensional instability due to the hygroscopic nature of wood, discoloration, biological degradation and degradation on exposure to UV light.

Many of the conventional leading technologies for treating wood or wood based materials comprise impregnation with heavy metal preservatives. However, the utilization of heavy metals in preservatives for timber treatment is now not favoured due to toxicity and environmental issues.

Acetylation of solid wood has been extensively investigated in the past, but due to the lack of an appropriate processing system to impregnate, react and recover the by-product of impregnation in a time period to be feasible, its commercial application has been limited. However acetylation is environmentally friendly and can improve all or some of the aforementioned shortcomings of wood Acetylation of the wood prevents water molecules from penetrating the cell wall by bulking the cell wall and substituting the hygroscopic hydroxyl groups of lignin and hemicellulose with hydrophobic (less polar) acetyl groups. Acetylation treatment can improve dimensional stabilization and biological resistance, and may also improve resistance to weathering effects, discoloration, and UV degradation.

Acetylation of solid wood is traditionally practiced in several steps. Typically, impregnation is first performed in a pressure cylinder and the acetylation reaction is then performed in a separate dedicated plant to heat and reflux the acetic anhydride for a lengthy period until acetylation is complete. After treatment and heat reaction, the by-product, which is a mixture of unreacted acetic anhydride and acetic acid, is recovered.

European patent 0 213 252 discloses a process in which wood was "impregnated by acetic anhydride using a vacuum or vacuum pressure technique, the material was then drained of excess acetic anhydride and placed in a chamber heated to 120° C. The material was heated at this temperature for 2 to 8 hours".

European patent 0 680 810 A1 and B1 discloses a process in which wood was impregnated by acetic anhydride at a temperature in the range of 80-150° C. preferably 90-130° C. and then maintained at a temperature between 70-150° C. for a period of time up to 24 hours (suitably about 3 hours) to cause the acetylation reaction within the wood.

The effect of different catalysts on the reaction rate has also been investigated, but heating to temperatures of up to 139° C., which is the boiling point of acetic anhydride, has proved to be the best option.

Gaseous acetylation of solid wood achieves insufficient loading or weight gain for improvement in stability and decay resistance. To achieve a 15% weight gain in acetylation theoretically 30% or more acetic anhydride is required. To impregnate gaseously this amount of acetic anhydride in solid wood requires an extremely long impregnation time. Gaseous acetylation of wood at high temperature has only been successful on very small wood particles such as fibers, flakes, chips or sawdust. U.S. Pat. No. 6,376,582 discloses use of vapour of the acetylating agent at a reaction temperature of around 140 to about 210° C. at atmospheric pressure. Thus the gaseous acetylation of solid wood is restricted to very small wood dimensions as the rate of vapour-phase acetylation is determined by the rate of diffusion of vapours into wood and the acetylation time rapidly increases with the increase in the wood thickness. Application of gaseous acetylation has therefore remained restricted to thin veneers or solid wood only a few inches long in the fiber direction, in relation to which acetylation can be achieved within a practical treating time.

Traditional acetylation processes that heat pre-impregnated, saturated wood to react the acetic anhydride have poor heating efficiency due to the following problems:

1: The mass of acetic anhydride in the wood.
2: The poor heat conductivity of wood.
3: The fact that the wood heating is by conduction rather than convection.
4: Heat distribution is not uniform throughout the solid wood and thus acetylation is uneven.
5: The total treatment, reaction and recovery period required is extremely long.

It is an object of the present invention to address at least some of these aforementioned shortcomings or to provide the public with a useful choice.

SUMMARY OF THE INVENTION

The present invention provides the process of independent claim 1. The dependent claims specify preferred but optional features. The invention provides a process for impregnating wood or wood based material comprising the steps of:

a. preheating a working solution to a temperature above the atmospheric boiling point ("a super hot temperature") of the working solution;
b. contacting a wood or wood based material with the working solution at a said super hot temperature and at an elevated pressure such that the working solution is in the liquid phase, to cause impregnation of the liquid base solution into the wood or wood based material; and
c. separating the wood or wood based material and any remaining working solution, waste material and/or by-products.

Preferably the process includes the step of, after impregnation, recovering the by-products by releasing the pressure to cause the by-products to boil off. Optionally a vacuum may be applied to improve the recovery of by-products.

Preferably pre-pressure is applied to the wood or wood based material prior to contact with the working solution at the super hot temperature to ensure the working solution remains in the liquid phase.

In another aspect the present invention provides a process wherein a solvent is selected from any one or more of water, isopropanol, methylene chloride, xylene and xylene mixed with paraffin wax.

In another aspect the present invention provides a process for impregnating wood or wood based material comprising the steps of:

a. preheating a working solution to a temperature above the atmospheric boiling point ("a super hot temperature") of the working solution, at an elevated pressure sufficient to maintain the working solution in the liquid phase;
b. applying a pre-pressure to a wood or wood based material prior to contact with the working solution at the super hot temperature, sufficient to maintain the working solution in the liquid phase;

c. contacting a wood or wood based material with the working solution at a said super hot temperature and a said elevated pressure to cause impregnation of the solution into the wood or wood based material;

d. applying further pressure (the 'working pressure') to assist the impregnation of the working solution into the wood or wood based material; and e. separating the wood or wood based material and any remaining working solution, waste material and/or by-products.

f. reducing the pressure to remove any further working solution, waste material and/or by-products.

The term 'comprising' as used in this specification and claims means 'consisting at least in part of', that is to say when interpreting independent claims including that term, the features prefaced by that term in each claim will need to be present but other features can also be present.

BRIEF DESCRIPTION OF THE DRAWINGS

The invention is further described with reference to the accompanying figures in which.

DETAILED DESCRIPTION

Figure 1:
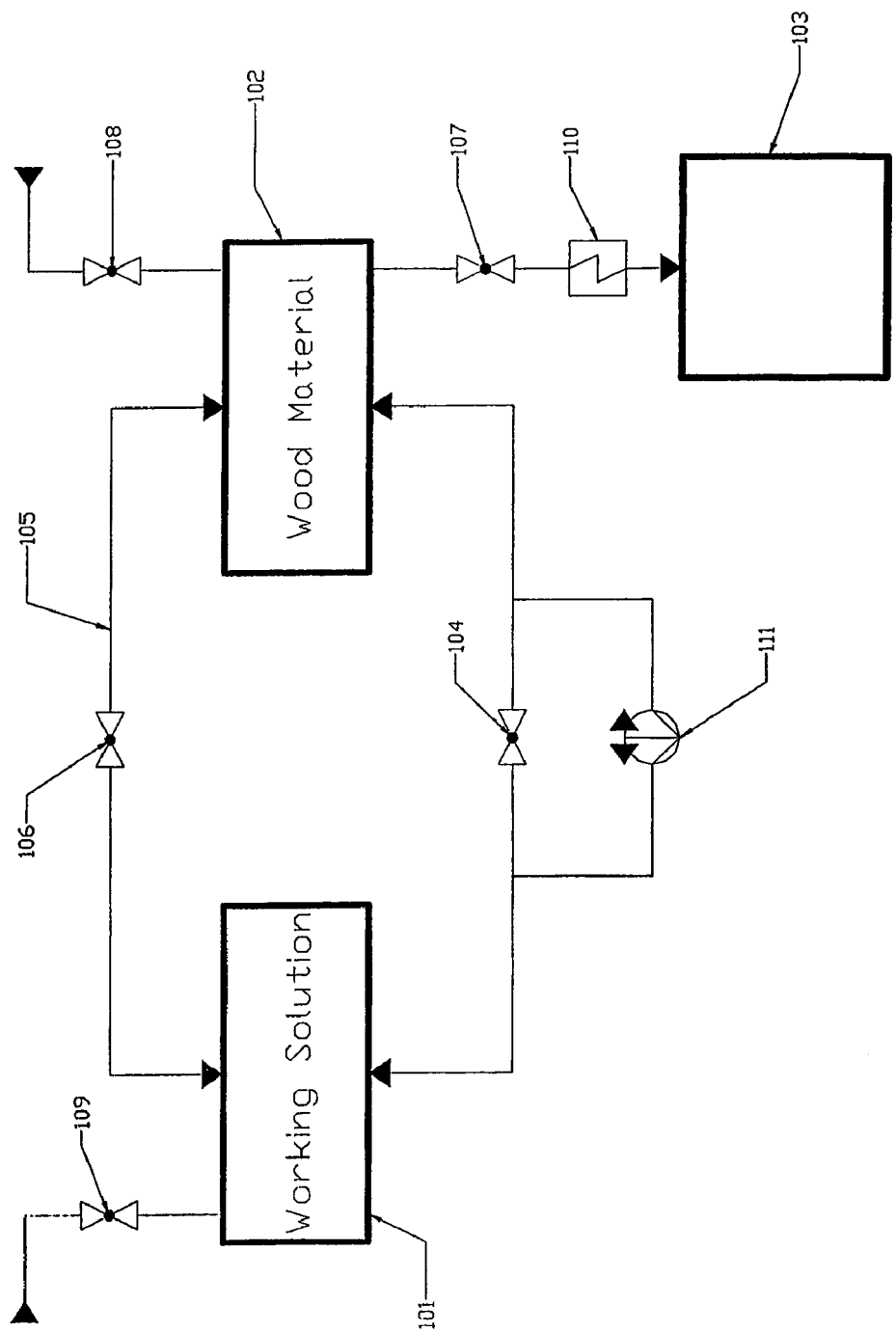
FIG. 1 is a schematic illustration of a preferred impregnation process.

In the process of the invention the solution is impregnated into the material in the liquid phase but at above the boiling point of the working solution, at a pressure which will maintain the working solution in the liquid phase. Typically the working solution will be preheated to a temperature above boiling point ("the super hot temperature") under a pressure which ensures the working solution remains in the liquid phase. Alternatively the working solution may be preheated to the super hot temperature at a pressure not sufficient to maintain the working solution in the liquid phase provided that pressure is subsequently applied so that when the working solution contacts the wood or wood based material it is in the liquid phase.

Also included within the scope of this invention is the preheating of the gaseous working solution which is subsequently condensed by the application of sufficient pressure so that the working solution is in the liquid phase when it contacts the wood or wood based material. Therefore the term working solution is to be interpreted to cover both gases and liquids.

The working solution is then released into a pressure impregnation vessel (which has been pre-pressurized by a gas, for example nitrogen or air, to equal or above the pressure of the working solution) containing the wood or wood based material. The elevated temperature will cause rapid reaction of the working solution in the wood while carrying out the impregnation in the liquid phase enables sufficient loading of acetic anhydride in the wood to be achieved to substantially enhance decay and insect resistance and dimensional stability of the wood, in a shorter processing time.

Any additional working solution and/or waste material is subsequently separated from the wood or wood based material to protect the working solution from contamination by wood extractives and reaction by-product.

Wood or wood based materials which may be treated by the process of the invention include, but are not limited to, solid wood, fiberboard, particle board, wood veneer, wood chips, OSB (oriented strand board), LVL (Laminated Veneer Lumber) and plywood.

Typically the process of the invention will be performed using two or more interconnected pressure vessels. Initially a first vessel contains the working solution and the wood is loaded into a second vessel. Optionally, a third vessel is connected to the second vessel to act as a reservoir for unreacted working solution and waste material.

Preferably the second vessel containing the wood or wood based material is evacuated and pressurized by a gas, such as air or nitrogen, prior to contact with the working solution. Suitable gases for applying pressure within the vessels include, but are not limited to, inert gases, for example nitrogen, argon and $CO_2$. The gas may also be a catalytic gas, for example acetic acid vapour at high temperature or acetic anhydride itself. Desirably pressurized air is used. The main purpose of introduction of gas or vapours into this vessel is to eliminate boiling off of the super hot solution introduced and consequently stop the working solution cooling. It is believed that the high temperature and the oxidation free environment may induce some additional benefits on both stability and biodeterioration resistance of wood due to thermal treatment.

The composition of the working solution will depend upon the desired effect of the impregnation. Typically, the impregnation process will aim to improve dimensional instability caused by the hygroscopic nature of the wood, discoloration, biological degradation and/or degradation by exposure to UV light. Examples of suitable working solutions include copper naphthenate in a solvent or solvents above their boiling point such as xylene, isopropanol and methylene chloride. Alternatively, xylene may be used as a heating medium by itself or in combination with paraffin wax. Since high temperature is involved in the process acetic anhydride may also be used to dissolve additional anhydrides, e.g. succinic anhydride. The working solution comprises acetic anhydride.

The working solution may be concentrated. Alternatively, the working solution may be diluted in an appropriate solvent, for example isopropyl alcohol (IPA), methylene chloride or water but is not limited thereto.

Desirably, the impregnation of the working solution within the wood or wood based material is assisted by the application of further pressure. The extra pressure can be either hydraulically or pneumatically applied.

Suitable pressure ranges for the pre-pressure stage are pressures sufficient to stop the solution from boiling at the elevated temperature, which can be from about 10 to about 1000 kPa and preferably about 20 to about 700 kPa. Pressure can be applied by the vapour of the solvent used formed from the heated solvent, for example xylene, acetic anhydride and/or acetic acid. Pre-pressure can be inert gas or air.

Suitable pressure ranges for the working pressure, i.e. the extra pressure after flooding, are about 20 to about 4000 kPa above the initial pre-pressure, but preferably about 20 to about 2000 kPa. The working pressure will be partly determined by the permeability of the wood material being impregnated. Denser or refractory woods are less permeable and require higher pressures to achieve satisfactory impregnation of the working solution.

Suitable temperature ranges are about 10° C. above the atmospheric pressure boiling point of the working solution and as high as recovery of excess solution warrants. In the case of acetic anhydride the temperature range is from about 150 to about 250° C., preferably from about 160 to about 220° C. The most preferred temperature is about 170 to about 200° C.

Preferably, once a desired pressure for maintaining the super hot working solution in a liquid phase has been attained, the pressure and/or temperature are held for a time sufficient to ensure reaction of the working solution within the wood or wood based product. The longer pressure is maintained, the greater the uptake of the working solution by the wood or wood based product. The term 'reaction' refers to any process which locks the working solution or part thereof within the wood or wood based product and may occur by biological, chemical or physical mechanisms. For example, when a working solution of acetic anhydride enters wood, it undergoes the substitution reaction below:

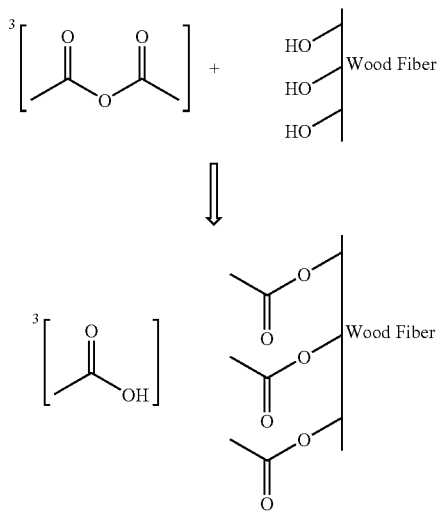

The acetyl group of acetic anhydride replaces the hydroxyl group of wood fibers with the formation of acetic acid by-product. The larger size of the acetyl group, compared to the hydroxyl group it replaces, causes a swelling of the wood which improves the properties of the wood, for example by reducing the moisture uptake of the wood.

Figure 2:
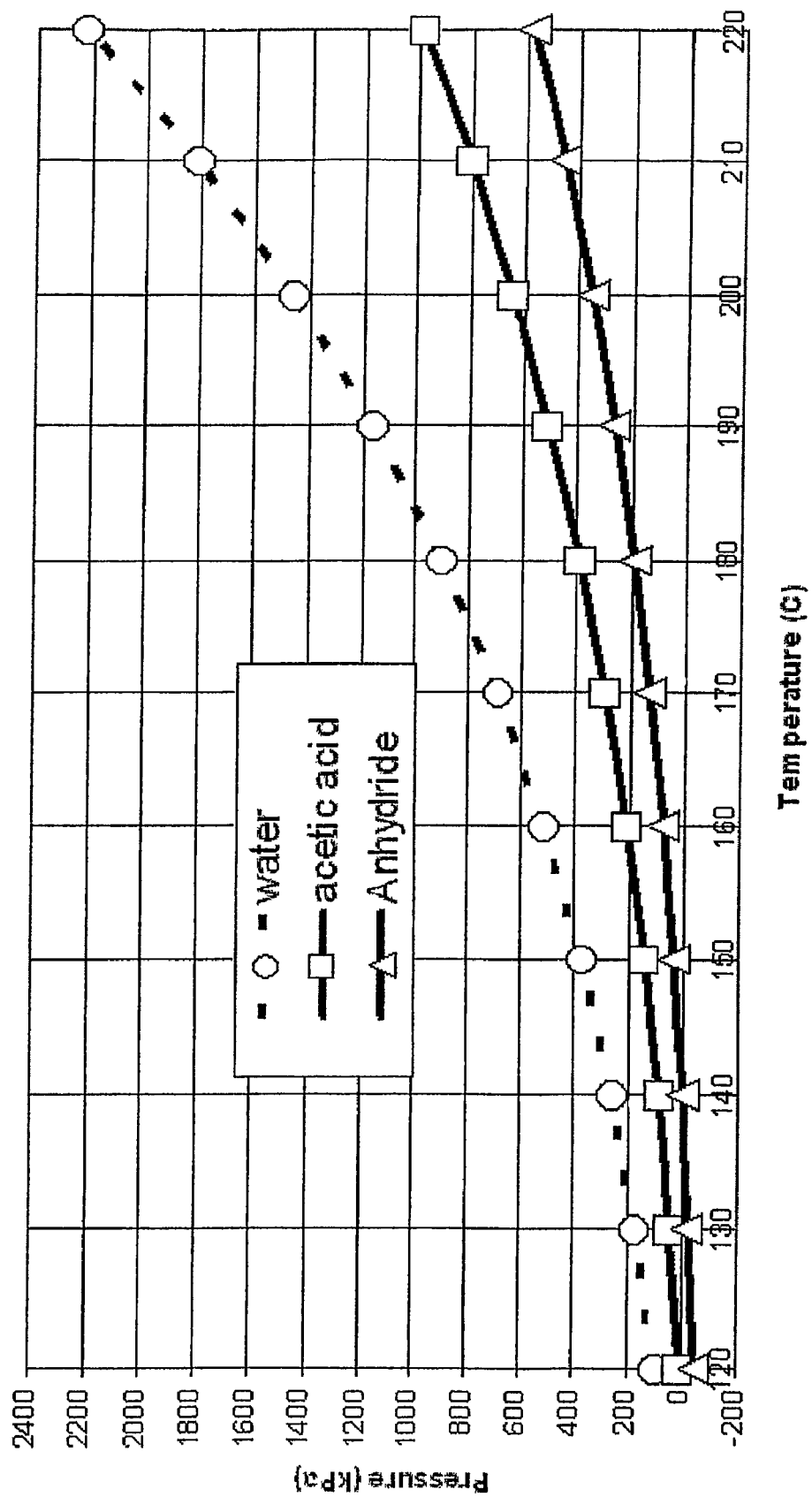
FIG. 2 is a chart of the boiling pressure at elevated temperature of water, acetic acid and acetic anhydride.

Desirably any by-products formed by the reaction will have a boiling point lower than that of the working solution. FIG. 2 shows that acetic acid (the by-product of the acetylation fixation reaction) has a boiling point lower than that of acetic anhydride. Therefore the pressure of acetic acid will be higher than that of acetic anhydride at any time during holding at high temperature. This facilitates the preferential extraction of by-product from the reaction vessel. It is also believed that the removal of reaction by-product may further encourage the fixation reaction.

Typical waste materials, in addition to reaction by-products, may include naturally occurring wood sugars, hemicelluloses, saccharides and extractives, for example resin and fatty acids.

Desirably the pressure is maintained in the second vessel during the separation and drainage of the working solution and wood materials to prevent kickback from the wood affecting the working solution (the kickback is generally weaker and/or the ingredients are no longer in balance and it may also contain naturally occurring sugars and other molecules present in the wood which are carried back out of the wood). Kickback may occur during the release of pressure ("pressure kickback") or during the application of a vacuum ("vacuum kickback").

By draining the working solution after contact with the wood while maintaining a working pressure the extractives and by-product (for example acetic acid) contamination are reduced. Once the working solution has been drained from the second vessel, a vacuum may be drawn through a condenser in a second vessel to facilitate the removal of further unreacted working solution from within the wood or wood based product together with any reaction by-products formed. Where the working solution comprises acetic anhydride, pressure kickback contains a mixture of acetic anhydride acetic acid and wood extractives and is coloured, typically red or brown, and vacuum kickback is colourless due to vaporisation condensation of acetic acid rather than liquid flow. This is mainly due to the initial high temperature of the working solution which facilitates the removal of corrosive unwanted acetic acid.

Extracted reaction by-products may optionally be separated, purified and recycled by methods known in the art. Acetic acid is the by-product of acetic anhydride in the working solution. The acetic acid is extracted as a gas and may be collected by condensation. By dehydrating the acetic acid, acetic anhydride is formed suitable for reuse in the impregnation process. By separating only vacuum kickback some contamination of the working solution by pressure kickback occurs which can be tolerated by adding more acetic anhydride to the working solution.

One embodiment of the impregnation process of the invention is shown in FIG. 1. Vessel 101 containing working solution (in this example acetic anhydride) is preheated up to about 220° C. at a vapour pressure of at least 600 kPa. Vessel 102 containing wood or wood-based material is evacuated and pre-pressurized using nitrogen through 108. Connecting lines 104 and 105 are opened allowing for the pressure between vessels 101 and 102 to equalize as the working solution enters vessel 102.

Once the pressure has equalised and flooding completed, valve 106 is closed and vessel 101 is placed under further pneumatic pressure through valve 109 which, via connecting line 104, in turn further pressurizes vessel 102. The final pressure shall be sufficient to ensure complete penetration of the product being impregnated. Alternatively a pressure pump (111) located in line 104 is used to pressurise cylinder 102. Pressure and temperature are held for a time to cause sufficient reaction of the working solution with the wood based material. Once the reaction is completed, excess working solution is drained from vessel 102 via connecting line 107 to vessel 103. Alternatively the solution can be returned to vessel 101, through line 104, by the pressure pump and/or pneumatic pressure.

Optionally, pneumatic pressure is applied to vessel 102 during draining of the working solution to avoid any kickback. This pressure can be vapour pressure of the super hot solution. Once the working solution has been drained, a vacuum is applied to vessel 102, through condenser 110, to remove any by-product liquid or gas (for example, where acetic anhydride is the working solution, the reaction by-product will be acetic acid. The acetic acid gas removed may be dehydrated to form acetic anhydride for reuse in the process).

In the process described above it is possible to effect treatment (impregnation), bulking (acetic anhydride reaction) and recovery all in one plant. This avoids the need to move the wood between a separate impregnation vessel and heat reaction plant, and also reduces the extra handling of corrosive chemicals.

It is believed that pre-impregnation of air or non-oxidative gas assists the deposition of chemicals where they are necessary (for example at "the cell wall").

When compared to the existing prior art vapour phase acetylation processes, the super hot temperature liquid phase acetylation process of the invention reduces the process time that would otherwise be required at the temperature used to achieve reaction in a single stage or vessel as in a vapour phase impregnation process, while achieving much higher deposit of acetic anhydride in the wood, sufficient to significantly enhance wood resistance to decay and insect attack and dimensional stability for example.

The process can also be used for other preservatives, solvents or combination of the two. For example copper naphthenate can be dissolved in any solvent and pre-heated to above the boiling point of solvent. After flooding and pressurizing using the super hot solvent (above boiling point) the recovery of the solvent is greatly facilitated.

Heat curing at elevated temperature using different solvent or oil and recovery of the solvent using the abovementioned process can bring dimensional stability, water repellency and decay resistance to the wood.

The following description of experimental work further illustrates the invention:

EXPERIMENT 1

Acetylation

Radiata pine matched sapwood measuring 300×60×45 mm for ASE (Anti Shrink Efficiency) and 300×20×20 mm for strength test was used in each run for the first nine treatments referred to below. Radiata pine matched sapwood measuring 300×65×45 mm for ASE and two 300×20×20 mm lengths for strength test was used for the treatments 10 to 20.

All wood samples were oven dried prior to treatments except treatments 6, 7 and 19.

Acetylation was conducted in three interconnected 2 liter stainless steel cylinders. Cylinders 1 and 2 had a heating jacket connected to PID controller to maintain temperature control. Pneumatic pressures were attained using compressed nitrogen gas.

The volumetric swelling coefficient was calculated according to the following formulae.

$$S = \frac{V_2 - V_1}{V_1} \times 100$$

where S=volumetric swelling coefficient
  V2=wood volume at water saturation
  V1=oven dried wood volume before saturation
Anti Shrink Efficiency was then calculated as follows:

$$ASE = \frac{S_C - S_M}{S_C} \times 100$$

where $S_C$ is volumetric swelling coefficient of control and $S_M$ is volumetric swelling coefficient of modified wood sample. Details of all treatments are summarized in Table 1

TABLE 1

| Treatment | Solution Temperature Before (C.°) | Extra Pressure kPa | Hydraulic Heating | Maximum Temp in Cylinder 2 (C.°) | Hydraulic Time (minute) | Pneumatic Time (minute) | Bleeding Time (minute) | Vacuum Time (minute) | Including recovery of by-products | Weight Gain After Treatment (%) | Reacted Weight Gain 48 h oven (%) | Unreacted 48 Hour Oven (%) | Volumetric ASE (%) | Oven Dried Volume Increase (%) |
|---|---|---|---|---|---|---|---|---|---|---|---|---|---|---|
| Con | | | | | | | | | | | | | | |
| 2 | 155 | 200 | Yes | 162 | 30 | 30 | | 40 | 100 | 24.6 | 19.4 | 5.1 | 73.5 | 7.4 |
| 3 | 175 | 200 | Yes | 180 | 30 | 30 | | 40 | 100 | 28.3 | 22.4 | 5.9 | 87.5 | 7.6 |
| 4 | 180 | 200 | Yes | 175 | 15 | 25 | | 30 | 70 | 25.4 | 23.2 | 2.2 | 87.4 | 9.6 |
| 5 | 200 | 200 | Yes | 159 | 20 | 20 | 15 | 25 | 80 | 32.1 | 20.6 | 11.6 | | |
| 6* | 170 | 200 | Yes | 158 | 10 | 20 | 20 | 35 | 85 | 20.9 | 7.6 | 13.4 | 72.1 | |
| 7* | 200 | 200 | Yes | 183 | 15 | 25 | 10 | 16 | 66 | 11.4 | 2.9 | 8.5 | 50.6 | |
| 8 | 190 | 500 | Yes | 191 | 60 | 1 | 10 | 8 | 79 | 36.7 | 29.8 | 6.9 | 90.9 | 12.9 |
| 9 | 190 | 500 | Yes | 194 | 45 | 2 | 10 | 10 | 67 | 29.2 | 24.9 | 4.3 | 78.1 | 10.7 |
| 10 | 190 | 500 | Yes | 170 | 10 | 1 | 10 | 20 | 41 | 25.1 | 23.0 | 2.1 | 75.4 | 9.1 |
| 11 | 180 | 500 | Yes | 186 | 45 | 1 | 5 | 15 | 66 | 32.8 | 28.5 | 4.3 | 81.1 | 10.2 |
| 12 | 190 | 500 | No | 130 | 5 | 1 | 18 | 15 | 39 | 22.6 | 13.9 | 8.7 | 62.4 | 7.6 |
| 13 | 200 | 500 | No | 137 | 5 | 1 | 16 | 20 | 42 | 27.5 | 19.6 | 7.9 | 69.4 | 8.3 |
| 14 | 190 | 800 | Yes | 159 | 10 | 1 | 10 | 20 | 41 | 26.0 | 21.7 | 4.3 | 74.7 | 8.3 |
| 15 | 200 | 500 | No | 141 | 5 | 40 | 5 | 32 | 82 | 42.8 | 23.4 | 19.4 | 71.7 | 8.3 |
| 16 | 190 | 500 | Yes | 161 | 10 | 1 | 4 | 28 | 43 | 22.1 | 19.8 | 2.3 | 69.7 | 8.3 |
| 17 | 190 | 500 | Yes | 158 | 10 | 1 | 6 | 10 | 27 | 20.6 | 18.1 | 2.5 | 65.7 | 7.5 |
| 18 | 180 | 500 | Yes | 179 | 20 | 1 | 5.5 | 30 | 57 | 28.2 | 25.5 | 2.7 | 80.4 | 9.3 |
| 19* | 180 | 500 | Yes | 178 | 20 | 1 | 7 | 30 | 58 | 10.4 | 6.6 | 3.7 | 64.3 | |

*Samples were not oven dried prior treatment

Net uptake, gross uptake, and pressure and vacuum kickback of all treatments are summarized in Table 2.

TABLE 2

Net uptake, Gross uptake, Pressure and Vacuum kickback

| Treatment | Net Uptake After Treatment (kg/m3) | Pressure Kickback (kg/m3) | Vacuum Kickback (kg/m3) | Gross Uptake During Treatment (kg/m3) |
|---|---|---|---|---|
| 2 | 84.87 | 166.3 | 120.4 | 371.6 |
| 3 | 101.01 | 244.9 | 35.7 | 381.6 |
| 4 | 88.12 | 110.2 | 32.7 | 231.0 |
| 5 | 109.39 | 66.8 | 72.4 | 248.7 |
| 6 |  | 88.8 | 78.6 |  |
| 7 | 44.31 | 57.1 | 85.7 | 187.2 |
| 8 | 128.99 | 150.0 | 140.8 | 419.8 |
| 9 | 155.38 | 176.6 | 125.7 | 457.7 |
| 10 | 129.51 | 217.9 | 54.7 | 402.1 |
| 11 | 163.78 | 170.8 | 103.6 | 438.3 |
| 12 | 119.27 | 241.8 | 84.5 | 445.6 |
| 13 | 140.89 | 195.8 | 91.2 | 427.8 |
| 14 | 132.38 | 305.2 | 118.0 | 555.6 |
| 15 | 210.58 | 77.7 | 99.8 | 388.1 |
| 16 | 113.40 | 206.3 | 92.1 | 411.9 |
| 17 | 108.94 | 172.7 | 77.7 | 359.4 |
| 18 | 137.61 | 205.4 | 102.7 | 445.7 |
| 19 | 68.46 | 185.2 | 91.2 | 344.9 |

Pressure kickback was a red brown colour due to extractives, but vacuum kickback was clear which indicates the vaporization of acetic acid from the wood due to its initial high temperature and its condensation rather than flowing out as liquid (note samples were not pre-extracted to remove extractives).

Figure 3:
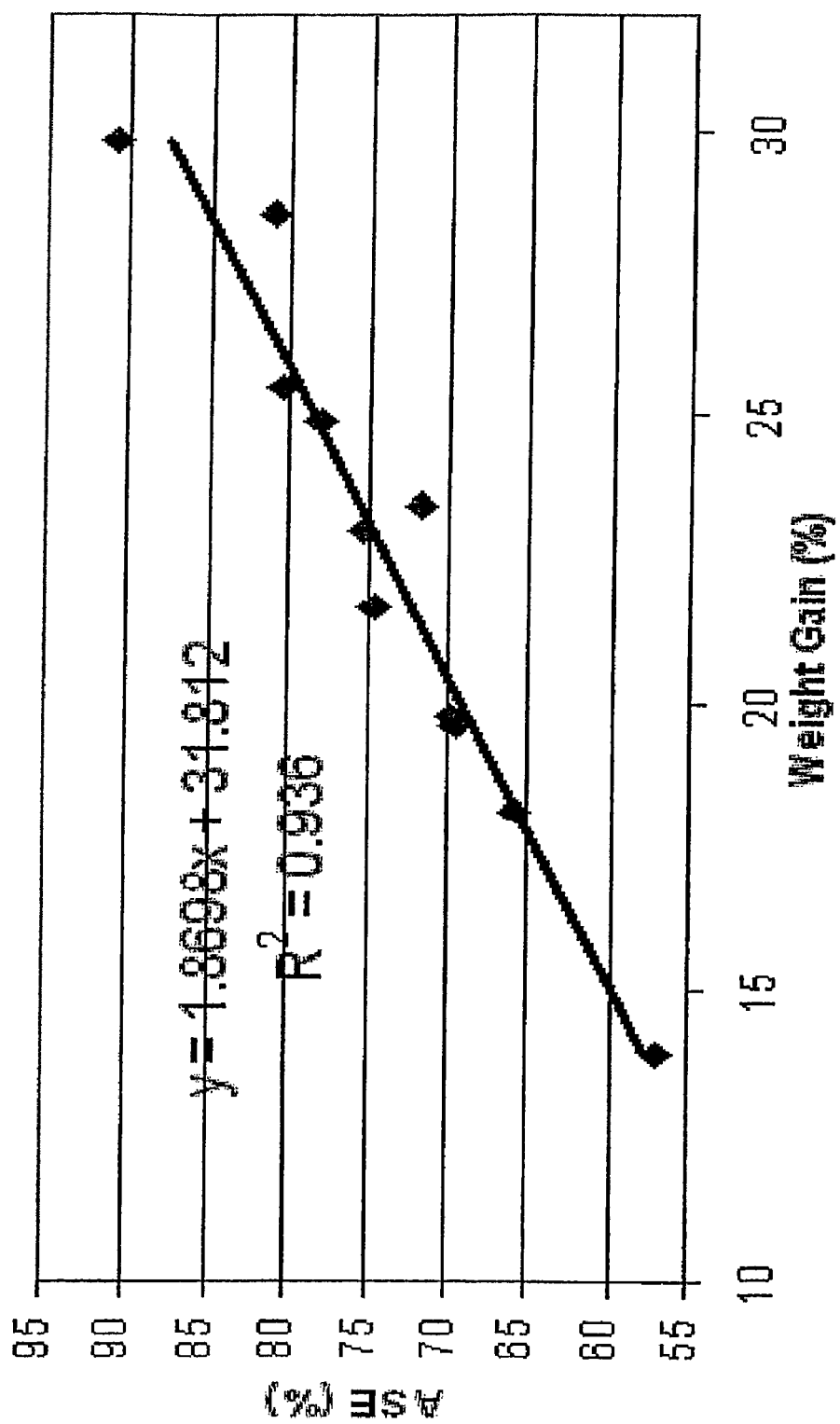
FIG. 3 shows the relationship between acetylation and volumetric Anti Shrink Efficiency (ASE).
Figure 4:
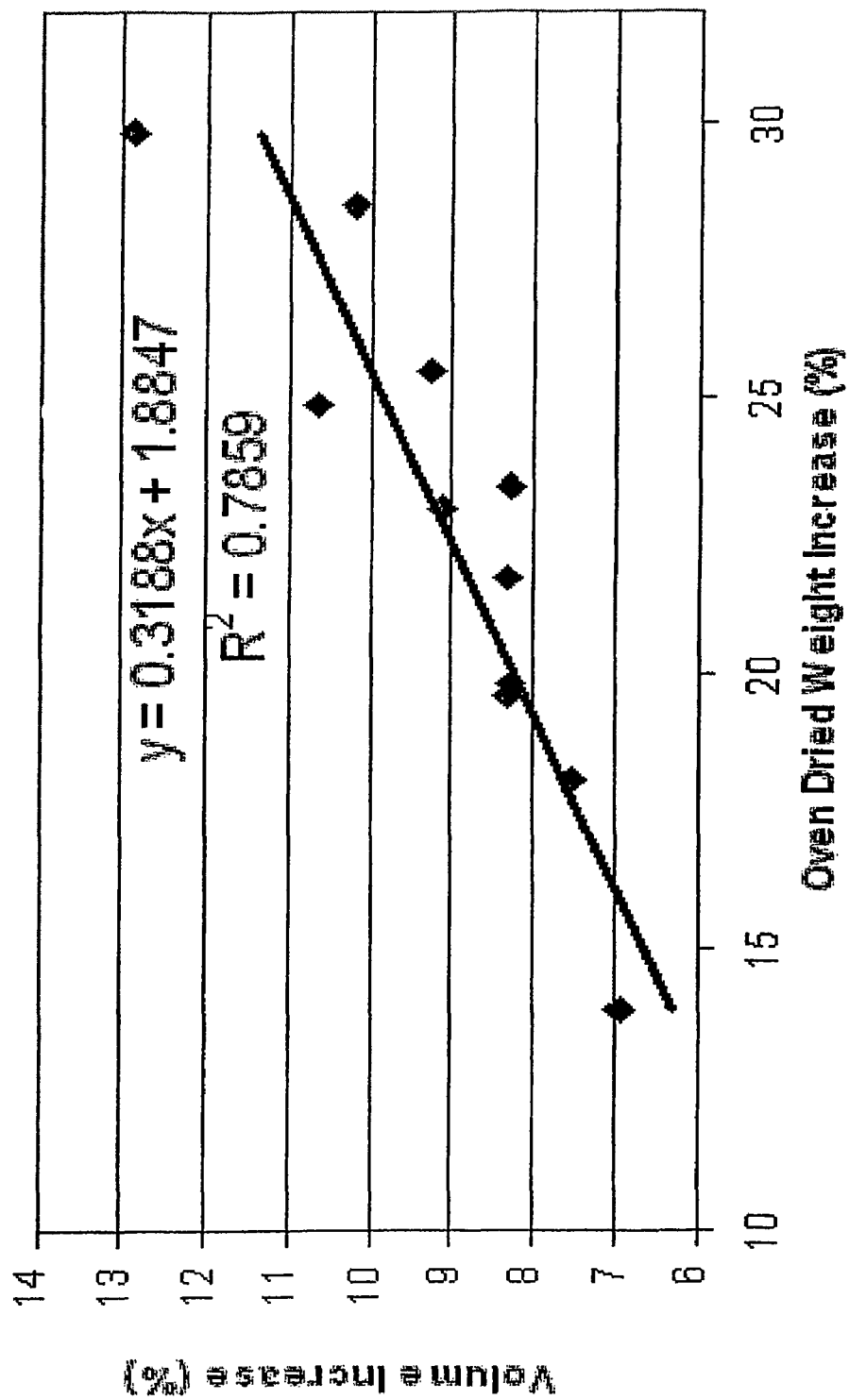
FIG. 4 shows the relationship between acetylation and increase in oven dried volume.

FIGS. 3 and 4 show the anti shrink efficiency (ASE) and oven dried volume increase of the wood samples. A limit of 28% weight gain is very close to the maximum theoretical reaction by acetylation. At higher temperatures adopted by this treatment process a weight loss due to solublisation of wood extractives of up to 2% is probable, thus the actual weight gain due to acetylation is probably higher.

FIG. 4 shows the close relation of bulking and ASE. Acetylation bulks the wood wall and thus the oven dried volume of wood increases. FIG. 4 shows this effect, which can be another way of measuring the extent of acetylation. In fact it is believed this volume increase is the main cause of ASE improvement.

Spectra of actual solutions were collected with horizontal ATR cell for treatment 5. Spectra showed that the solution before treatment was 100% acetic anhydride, after treatment solutions showed that the majority of working solution was acetic anhydride, the majority of pressure kickback solution was acetic acid and the vacuum kickback solution was mostly acetic acid (by-product).

The results show that high acetylation of radiata pine sapwood can be achieved in a very short time.

EXPERIMENT 2

Alternative Solvents with Preservative Agent and not Forming Part of the Present Invention Two solvents, Isopropyl alcohol and methylene chloride were tried with copper naphthenate as the preservative. One piece of radiata pine sapwood end-sealed 290×72×44 mm was treated in each treatment.

A total of five treatments were conducted, three with Isopropyl alcohol and two with Methylene Chloride. Treatment time for all treatments was 35 minutes. The plant described in experiment 1 was used and cylinder 102 was pre heated to 70° C. for all treatments. Initial pneumatic pre-pressure for all treatments was adjusted to the boiling pressure of respective solvent at elevated temperature.

Table 3 shows the treatment process and solvent recovery for all treatments.

TABLE 3

Treatment Process, Net Uptake, Net Copper Naphthenate Uptake and Solvent remaining in the Wood

| Treatment | Solvent Temperature (° C.)/ Pressure (kPa) | Hydraulic Pressure (kPa) | Net Uptake (Kg/m$^3$) | Net Copper Naphthenate Calculated (Kg/m$^3$) | Analytical Copper (% w/w) in Wood | Net Solvent Uptake Calculated (Kg/m$^3$) | Copper Penetration |
|---|---|---|---|---|---|---|---|
| Isopropyl 1 | 112/205 | 280 | 9.8 | 7 | 0.03 | 2.8 | Complete |
| Isopropyl 2 | 112/190 | 290 | 18.4 | 13 | 0.08 | 5.4 | Complete |
| Isopropyl 3 | 116/220 | 380 | 17.9 | 13 | 0.07 | 4.9 | Complete |
| Methylene 1 | 88/300 | 440 | 16.6 | 12 | 0.08 | 4.6 | Complete |
| Methylene 2 | 86/295 | 520 | 12.9 | 10 | 0.09 | 2.9 | Complete |

EXPERIMENT 3

Further Acetylation and Other Species

A further experiment was conducted on Sitka spruce, Scots pine and radiata pine as in Table 4.

Succinic anhydride also reacts to wood hydroxyl group in the same way as acetic anhydride, but creating no acidic by-product. In treatment 39, 10% succinic anhydride was dissolved in acetic anhydride working solution to observe the reduction of wood charring and effect on other wood properties.

TABLE 4

|  | Treatment | Wood Moisture Content | Solution Temperature Before (C. °) | Extra Pressure (kPa) | Maximum Temp (C. °) | Hydraulic Time (minute) | Pneumatic Time (minute) | Bleeding Time (minute) | Vacuum Time (minute) | Total Time (minute) Including Recovery |
|---|---|---|---|---|---|---|---|---|---|---|
|  | Radiata 37 | OD | 198 | 500 | 155 | 5 | 1.0 | 1.5 | 40 | 47.5 |
|  | Radiata 38 | OD | 190 | 500 | 167 | 15 | 1.0 | 2 | 40 | 58 |
| 10% SA* | Radiata 39 | OD | 191 | 500 | 169 | 16 | 1.0 | 2 | 38 | 57 |
| Used AA** | Radiata 40 | OD | 193 | 500 | 168 | 15 | 1.0 | 2 | 38 | 56 |
| Used AA | Radiata 41 | 9 | 190 | 500 | 168 | 16 | 1.0 | 2 | 40 | 59 |
|  | Radiata 48 | OD | 220 | 500 | 168 | 15 | 1.0 | 2 | 36 | 56 |
|  | Radiata 49 | OD | 220 | 500 | 150 | 5 | 1.0 | 2 | 50 | 59 |
|  | Scots 1 | OD | 190 | 800 | 162 | 10 | 1.0 | 5 | 33 | 49 |
|  | Spruce 1 | OD | 193 | 800 | 162 | 10 | 1.0 | 3 | 40 | 54 |
|  | Scots 2 | OD | 180 | 500 | 139 | 5 | 1.0 | 3 | 46 | 55 |
|  | Spruce 2 | OD | 182 | 500 | 143 | 5 | 1.0 | 3 | 44 | 53 |

*10% succinic anhydride dissolved in acetic anhydride
**Acetic anhydride working solution was from previous treatments The weight gain and ASE of third experiments are in Table 5 below.

TABLE 5

| Treatment | Weight gain Aft Treatment (%) | Reacted Weight Aft Oven (%) | Un reacted (%) | Burning Inside 0 Min to 5 Max | ASE (%) |
|---|---|---|---|---|---|
| Scots Pine 1 | 29.10 | 23.18 | 5.92 | 2.00 | 82.10 |
| Scots Pine 2 | 25.39 | 18.95 | 6.44 | 0.00 | 72.40 |
| Spruce 1 | 26.33 | 16.21 | 10.11 | 2.00 | 70.80 |
| Spruce 2 | 17.86 | 11.03 | 6.83 | 0.00 | 40.40 |
| Radiata 37 | 19.11 | 17.01 | 2.10 | 0.50 | 63.56 |
| Radiata 38 | 21.60 | 19.30 | 2.30 | 0.25 | 70.95 |
| Radiata 39 | 25.10 | 22.80 | 2.30 | 0.00 | 70.10 |
| Radiata 40 | 21.00 | 18.50 | 2.50 | 0.00 | 68.51 |
| Radiata 41 | 5.50 | 8.10 | 5.40 | 0.25 | 39.34 |
| Radiata 48 | 20.4 | 18.4 | 2.00 | 0.00 | 64.4 |
| Radiata 49 | 16.95 | 15.58 | 1.37 | 0.00 | 39.5 |

EXPERIMENT 4

Further Heat Curing by Super Hot Solvent

Super heated xylene at 200° C. was used as a medium for heat treatment. Two treatments were conducted, xylene and 5% paraffin wax dissolved in xylene. In both treatments radiata pine sapwood at 9% moisture content was used. Wood was light brown in colour after treatments and lost weight due to extractives dissolved in xylene. Treatment process is summarised in Table 6

TABLE 6

|  | Wood Moisture Content | Solution Temperature Before | Extra Pressure | Maximum Temp | Hydraulic Time | Pneumatic Time | Bleeding Time | Vacuum Time | Total Time |
|---|---|---|---|---|---|---|---|---|---|
| xylene | 9 | 201 | 500 | 201 | 30 | 3.0 | 10 | 25 | 68 |
| xylene + wax | 9 | 202 | 500 | 210 | 30 | 3.0 | 8 | 30 | 71 |

ASE for xylene treated sample was 13.2% and for 5% wax dissolved in xylene was 7.8%.

EXPERIMENT 5

Recycling Acetic Anhydride

Further experiments were conducted in which the acetic anhydride used was a recycled solution from previous treatments and contained wood extractives and by-product acetic acid. A treatment schedule was followed and from treatment 71 onward working solution was not renewed but topped up by acetic anhydride. Thus in treatment 92 the working solution was used/topped up for 20 times. Xylene, a non-swelling solvent, was chosen to dilute this acetic anhydride working solution. Dilutions were performed on a weight/weight basis as shown in Table 7.

TABLE 7

Dilution Summary

| Treatment ID | Acetic anhydride (%) | Xylene (%) |
|---|---|---|
| 92 | 100 | 0 |
| 93 | 80 | 20 |
| 95 | 60 | 40 |
| 96 | 40 | 60 |
| 97 | 20 | 80 |
| 94 | 0 | 100 |

TABLE 8

Schedule Summary

| Solution Temperature | ° C. | 190 |
|---|---|---|
| Initial Pressure* | kPa | 300-400 |
| Working Pressure | kPa | 1100 |
| Hydraulic Time | minutes | 10 |
| Hydraulic Temperature | ° C. | 160 |
| Pneumatic Time | minutes | 1 |

TABLE 8-continued

Schedule Summary

| Pressure Release | minutes | 3 |
|---|---|---|
| Vacuum Time | minutes | 43 |

*Due to the solution being a mixture, the boiling point and subsequently pressure was different depending on the composition Degree of Acetylation The affect of percentage acetic anhydride on weight gain (degree of acetylation) is shown in Table 9.

TABLE 9

Effect of Anhydride Concentration on Weight Gain

| Acetic Anhydride % | Weight Gain After Treatment (%) | Un-recovered (%) | Actual Weight Gain (%) |
|---|---|---|---|
| 100 | 28.4 | 3.7 | 23.7 |
| 80 | 25.2 | 3.3 | 21.2 |
| 60 | 20.8 | 2.6 | 17.8 |
| 40 | 17.7 | 3.3 | 13.9 |
| 20 | 12.2 | 3.8 | 8.1 |
| 0 | 1.2 | 0.7 | 0.5 |

These trials were conducted at a uniform total time of 60 minutes.

If time was not a limiting factor then an increased weight gain may have been achieved with the diluted working solutions.

Internal Burning

Impregnated 300 mm long samples of wood were cut across their midpoint reveal their cross section. The exposed cross sections were sanded. Both the experiments using a 100% acetic anhydride working solution and experiments using a working solution diluted with xylene showed uniform colour and no sign of internal burning. This indicates that it is possible to avoid possible wood charring by dilution of the working solution with xylene and/or by process manipulation.

EXPERIMENT 6

Acetylation Treatments at 20 Liter Pilot Plant

In treatment 208 radiata pine heartwood and sapwood having different sizes were treated by pre-heating acetic anhydride to 173° C. and using the pressure of the gaseous acetic anhydride formed to pre-pressurise the acetic anhydride to 130 kPa thereby maintaining the liquid phase. The working pressure applied to the wood and acetic anhydride was 1000 kPa. The size and weight gains of the samples are illustrated in table 10.

TABLE 10

| Treatment No. 208 Sample | Sample size | | | Weight gain % | Un Reacted & By-product % |
|---|---|---|---|---|---|
| | Width (g) | Thickness (mm) | Length (mm) | | |
| A | 90.07 | 45.75 | 645 | 27.55 | 3.08 |
| B | 90.05 | 45.14 | 645 | 27.28 | 2.73 |
| C | 89.76 | 45.16 | 645 | 26.55 | 3.48 |
| D | 89.62 | 45.19 | 645 | 31.65 | 6.16 |
| D1 | 89.76 | 20.19 | 645 | 32.64 | 7.09 |
| D2 | 90.04 | 19.71 | 645 | 31.14 | 5.24 |

In treatment 209 radiata pine heartwood and sapwood having two different thickness were treated by pre-heating acetic anhydride to 170° C. and using the pressure of the gaseous acetic anhydride formed to pre-pressurise the acetic anhydride to 110 kPa thereby maintaining the liquid phase. The working pressure applied to the wood and acetic anhydride was 310 kPa. The size and weight gains of the samples are provided in table 11.

TABLE 11

| Treatment No. 209 Sample | Sample size | | | Weight gain % | Un Reacted & By-product % |
|---|---|---|---|---|---|
| | Width (g) | Thickness (mm) | Length (mm) | | |
| A | 90.07 | 45.75 | 645 | 13.04 | 1.28 |
| B | 90.05 | 45.14 | 645 | 12.29 | 1.45 |
| C | 89.76 | 45.16 | 645 | 10.68 | 2.13 |
| D | 89.62 | 45.19 | 645 | 13.66 | 2.48 |
| D1 | 89.76 | 20.19 | 645 | 18.61 | 0.87 |
| D2 | 90.04 | 19.71 | 645 | 20.50 | 1.12 |

The foregoing describes the invention and a preferred form thereof. Alterations and modifications as will be obvious to those skilled in the art are intended to be incorporated within the scope hereof, as defined in the accompanying claims.

What we claim is:

1. A process for impregnating wood or wood based material using acetic anhydride, the process comprising the steps of:
   a. preheating a working solution comprising acetic anhydride to a temperature above the atmospheric boiling point of the working solution in a range of 170 to 200° C. to form a working solution at a super hot temperature, wherein sufficient pressure is applied throughout the preheating step to ensure the working solution is maintained in a liquid phase;
   b. contacting a wood or wood based material with the working solution at said super hot temperature and at an elevated pressure such that the working solution is maintained in the liquid phase, to cause impregnation of the liquid phase solution into the wood or wood based material and to react the liquid phase working solution within the wood or wood based material wherein the reaction of the liquid phase working solution is a substantially complete acetylation reaction;
   c. separating the wood or wood based material and any remaining working solution, waste material and/or by-products following the substantially complete acetylation reaction, whilst maintaining the elevated pressure; and
   d. releasing pressure to separate pressure kickback, the pressure kickback being any remaining working solution, waste materials, and by-products.

2. The process as claimed in claim 1 including applying an initial pre-pressure to the wood or wood based material prior to contact with the working solution at the super hot temperature, sufficient to maintain the working solution in the liquid phase.

3. The process as claimed in claim 2 including applying the pre-pressure by a gas.

4. The process as claimed in claim 3 wherein the gas is selected from nitrogen, air, carbon dioxide, argon, acetic acid vapor or acetic anhydride vapor.

5. The process as claimed in claim 2 including pre-pressurizing the working solution to in the range of 10 to 1000 kPa.

6. The process as claimed in claim 2 including pre-pressurizing the working solution to in the range of 20 to 700 kPa.

7. The process as claimed in claim 1 including assisting the impregnation of the solution into the wood or wood based material by applying a working pressure comprising a further hydraulic or pneumatic pressure.

8. The process as claimed in claim 7 including applying the working pressure in the range of 20 to 4000 kPa above the initial pre-pressure.

9. The process as claimed in claim 7 including applying the working pressure in the range of 20 to 2000 kPa above the initial pre-pressure.

10. The process as claimed in claim 7 including applying the working pressure for less than about 240 minutes.

11. The process as claimed in claim 7 including applying the working pressure for less than 120 minutes.

12. The process as claimed in claim 7 including applying the working pressure for between about 1 and about 60 minutes.

13. The process as claimed in claim 1 including applying a vacuum to separate any remaining working solution, waste material and/or by-products which create a vacuum kickback.

14. The process as claimed in claim 13 including recycling the pressure kickback, the vacuum kickback or both for reuse as the working solution.

15. The process as claimed in claim 14 including adding further of said working solution to the recycled working solution and reusing same.

16. The process as claimed in claim 1 wherein the boiling point of the reaction by-products is lower than the boiling point of the working solution.

17. The process as claimed in claim 1 wherein the wood or wood based material is selected from one or more of solid wood, fibreboard, particle board, wood veneer, wood chips, oriented strand board, laminated veneer board and plywood.

18. The process according to claim 1 including when carried out in a plant comprising:
   a. a first pressure vessel for initially containing and pre-heating the working solution; and
   b. a second pressure vessel for containing and contacting the wood or wood based material with the working solution.

19. The process as claimed in claim 18 wherein said plant also includes a third pressure vessel as a reservoir for unreacted working solution, waste material and/or by-products, said third pressure vessel communicating with said second pressure vessel.

20. The process as claimed in claim 1 wherein the working solution also comprises xylene and/or succinic acid.

21. The process as claimed in claim 1 including combining the working solution with a solvent.

22. The process as claimed in claim 21 wherein the solvent is selected from any one or more of water, isopropanol, methylene chloride, xylene and xylene mixed with paraffin wax.

23. A process for impregnating wood or wood based material using acetic anhydride, the process comprising the steps of:
   a. preheating a working solution comprising acetic anhydride to a temperature above the atmospheric boiling point of the working solution in a range of 170 to 200° C. to form a working solution at a super hot temperature, at an elevated pressure sufficient to maintain the working solution in the liquid phase;
   b. applying a pre-pressure to a wood or wood based material prior to contact with the working solution at the super hot temperature, sufficient to maintain the working solution in the liquid phase;
   c. contacting a wood or wood based material with the working solution at said super hot temperature and said elevated pressure to cause impregnation of the solution into the wood or wood based material and to react the liquid phase working solution within the wood or wood based material wherein the reaction of the liquid phase working solution is a substantially complete acetylation reaction;
   d. applying further working pressure to assist the impregnation of the working solution into the wood or wood based material and the substantially complete acetylation reaction within the wood or wood based material;
   e. separating the wood or wood based material and any remaining working solution, waste material and/or by-products following the substantially complete acetylation reaction, whilst maintaining the working pressure; and
   f. reducing the pressure to remove any further working solution, waste material and/or by-products, which create a pressure kickback.

24. The process according to claim 23 including when carried out in a plant comprising:
   a. a first pressure vessel for initially containing and pre-heating the working solution; and
   b. a second pressure vessel for containing and contacting the wood or wood based material with the working solution.

25. A process for impregnating wood or wood based material using acetic anhydride, the process comprising the steps of
   a. preheating a working solution comprising acetic anhydride to a temperature above the atmospheric boiling point of the working solution in a range of 170 to 200° C. to form a working solution at a super hot temperature, at an elevated pressure sufficient to maintain the working solution in the liquid phase;
   b. contacting a wood or wood based material with the working solution at said super hot temperature and said elevated pressure to cause impregnation of the solution into the wood or wood based material and to react the liquid phase working solution within the wood or wood based material wherein the reaction of the liquid phase working solution is a substantially complete acetylation reaction;
   c. separating the wood or wood based material and any remaining working solution, waste material and/or by-products following the substantially complete acetylation reaction, whilst maintaining the elevated pressure;
   d. releasing pressure to separate pressure kickback, the pressure kickback being any remaining working solution, waste materials, and by-products; and
   e. recycling any separated working solution, waste material and/or by-products as the working solution.

26. The process according to claim 25 including when carried out in a plant comprising:
   a. a first pressure vessel for initially containing and pre-heating the working solution; and
   b. a second pressure vessel for containing and contacting the wood or wood based material with the working solution.

* * * * *